March 29, 1932.  C. A. FOX  1,851,041

QUICK OPERATING WORKHOLDING DEVICE

Filed March 4, 1931

WITNESSES
C. B. Wallace.
E. O. Johns

INVENTOR
Cyril A. Fox
By Brown & Critchlow
Attorneys

Patented Mar. 29, 1932

1,851,041

UNITED STATES PATENT OFFICE

CYRIL A. FOX, OF OAKMONT, PENNSYLVANIA

QUICK-OPERATING WORKHOLDING DEVICE

Application filed March 4, 1931. Serial No. 520,100.

My invention pertains to work-holding devices and particularly to such devices for use in circumstances which demand quick operation, as for instance where pieces are to be successively clamped into place in a machine for operating thereon. An especially useful application of my invention is in conjunction with grinding machines for cutting away portions of castings, billets or the like, where the operator is required to place a piece of work in the machine, perform the desired operation upon it and proceed to another piece of work with a minimum loss of time.

An important object of my invention is to provide such a work-holding device which will be exceptionally convenient to use, and capable of being especially quickly operated to clamp the work in place. Another object is to provide such a work-holding device which will be capable of use with widely varying shapes and sizes of objects to be clamped thereby. A further object is to provide such a work-holding device which will be of a specially simple, economical and rugged construction.

A work-holding device constructed in accordance with my invention, as applied to a grinding machine, is described, by way of example, in the following specification and shown in the accompanying drawings. However, it is to be understood that my invention may be embodied in other forms, and that changes may be made in the apparatus shown and described, without exceeding the scope thereof as defined in the appended claims.

Figure 1:
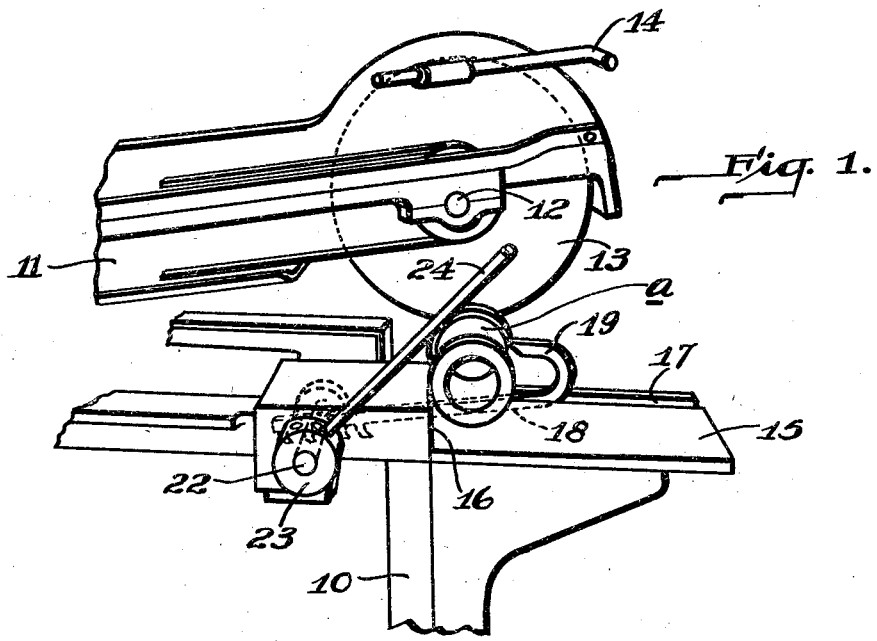
Fig. 1 is a perspective view showing a portion of a grinding machine provided with a work-holding device constructed in accordance with my invention.

Although the work-holding device of my invention is susceptible of other uses, it is herein shown as applied to a grinding machine which includes a base 10 with which is associated, as by hinging, a support 11 in which is revolubly mounted a shaft 12 carrying a suitably driven grinding wheel 13. In the machine shown, the grinding wheel 13 takes the form of a disk, so that upon the support 11 being moved downward, by the operator pulling upon a handle 14, the wheel will cut away any object which may be in its path. A common use of such machine is in the removal of sprue from castings, though it is economical to cut many other metallic objects in the same manner.

Upon the base 10 is mounted a work-table 15 having, at the inner end thereof, an abutment, or fixed jaw member, 16. The table has formed longitudinally thereof, close to the edge which is adjacent the grinding wheel 13, a slot 17 for the reception of the shank 18 of the movable jaw member, shown herein as taking the form of a hook 19.

In the operation of the device the work is placed upon the table 15 with the portion thereof which is to be cut off projecting into the path of the grinding wheel 13 and with one side thereof engaging against the fixed jaw member 16. The hook 19 is pushed up against the opposite side of the work and then tightened against such opposite side by the means now to be described.

Figure 2:
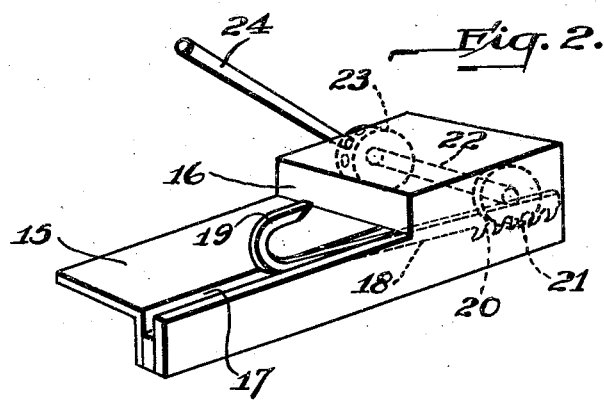
Fig. 2 is another perspective view showing the work-table and holding device as seen from the side opposite from that shown in Fig. 1.

The shank 18 of the movable jaw member is formed with a plurality of curved slots 20 in one or another of which is adapted to engage a crank pin 21 secured to a shaft 22 which is revolubly mounted in the work-table 15, extending transversely of the latter. The end of the shaft projects beyond one side of the work-table and carries a disk 23 from which an operating handle 24 projects. When a piece of work, such as the casting a shown in Fig. 1, is to be clamped in the machine, to have a cutting operation performed thereon, such casting is placed against the fixed jaw member 16 and the movable jaw member is pushed against it. The crank pin 21 will thus enter, or be about to enter, one of the slots 20 in the shank of the movable jaw member. The operator then pulls downward upon the handle 24, which causes the crank pin 21 to move to the right, as seen in Fig. 2, drawing the hook 19 strongly against the work and clamping the latter firmly against the fixed jaw member 16. The operation of clamping the work in place, therefore, is accomplished by the speedily effected steps of manually pushing the hook 19 against the work and then pulling down on the handle 24, the release being equally rapid.

Figure 3:
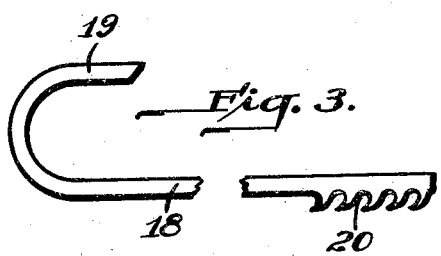
Fig. 3 is a side view of one of the jaw members.

The pieces to be handled in any one run of work will usually be much alike, so that the same movable jaw member can be employed, without the necessity of removing it from the work-table. However, in different runs of work, articles of different thickness and diameter and also different width will be encountered. To meet this situation I provide a plurality of the movable jaw members, having hooks, or other work-engaging portions, of varying shapes. Also, to accommodate pieces of varying width, I provide movable jaw members, the shanks 18 of which vary in length. A movable jaw member having a hook portion 19 of relatively large width and a shank 18 of considerable length, as compared with the member shown in Figs. 1 and 2, is illustrated in Fig. 3.

It is to be noted that by forming the movable jaw member of hook shape, as in the particular embodiment of my invention here illustrated, the point of the hook forces the work down against the table whilst at the same time clamping it against the fixed jaw 16. In this way pieces of work of widely differing shapes and contours are readily clamped in place firmly and securely.

I claim:

1. A work holding device comprising a work table having a jaw member associated therewith, a jaw member associated with said table for free sliding movement with respect thereto, whereby said jaw member can be moved rapidly into engagement with the work, said movable jaw member having a portion formed with a plurality of notches, an eccentrically mounted member for engagement in one or another of said notches when said movable jaw member is moved into engagement with the work, and means for rotating said eccentrically mounted member to tighten said movable jaw member against the work.

2. A work holding device comprising a work table having a jaw member associated therewith, a jaw member associated with said table for free sliding movement with respect thereto, whereby said jaw member can be moved rapidly into engagement with the work, said movable jaw member having a portion formed with a plurality of notches, a shaft extending transversely of said table and having a crank-pin at one end thereof disposed for engagement by one or another of the notches of said movable jaw member when the latter is moved into engagement with the work, and means for rotating said shaft to tighten said movable jaw member against the work.

3. A work holding device comprising a work table having a jaw member associated therewith, a second jaw member associated with said table for free sliding movement with respect thereto, whereby said jaw member can be moved rapidly into engagement with the work, said movable jaw member having a portion for engaging the work at the side thereof remote from said work table and another portion formed with a plurality of notches, an eccentrically mounted member for engagement in one or another of said notches when said movable jaw member is moved into engagement with the work, and means for rotating said eccentrically mounted member to tighten said movable jaw member against the work, whereby the work is clamped laterally against said first named jaw member and downwardly against said work table.

4. A work holding device comprising a work table having a jaw member associated therewith, a jaw member associated with said table for free sliding movement with respect thereto, whereby said jaw member can be moved rapidly into engagement with the work, said movable jaw member including a hook-shaped portion having the point thereof disposed to engage the work at the side thereof remote from said work table and another portion formed with a plurality of notches, an eccentrically mounted member for engagement in one or another of said notches when said movable jaw member is moved into engagement with the work, and means for rotating said eccentrically mounted member to tighten said movable jaw member against the work, whereby the work is clamped laterally against said first named jaw member and downwardly against said work table.

In testimony whereof, I sign my name.

CYRIL A. FOX.